United States Patent Office 3,707,536
Patented Dec. 26, 1972

3,707,536
PROCESS FOR THE ISOLATION AND PURIFICATION OF S-ADENOSYL METHIONINE AND ETHIONINE AND NOVEL SULFATES THEREOF
Erich Haid and Michael Nelboeck-Hochstetter, Tutzing, Upper Bavaria, Germany, assignors to Boehringer Mannheim G.m.b.H., Mannheim-Waldhof, Germany
No Drawing. Filed Apr. 13, 1970, Ser. No. 27,994
Int. Cl. C07d 51/54
U.S. Cl. 260—211.5 R                              12 Claims

ABSTRACT OF THE DISCLOSURE

S-adenosyl - 1 - methionine and S-adenosyl-1-ethionine are obtained from yeast in substantially pure form and in high yield by subjecting the yeast to acid digestion and cation exchange chromatography and to either one or both of the process steps of (1) picric acid precipitation and (2) boric acid addition to give a borate complex which is then chromatographed through an anion exchanger at a weakly alkaline pH, which process steps (1) and (2), if both are utilized, can be carried out in either sequence. New S-adenosyl - 1 - methionine bisulfate and S-adenosyl - 1 - ethionine of exceptional stability are also provided.

---

The present invention relates to a process for the isolation of S-adenosyl - 1 - methionine and of S-adenosyl-1-ethionine from yeast and the further purification of these substances. The invention is also directed to the provision of novel sulfates of S-adenosyl-1-methionine and of S-adenosyl-1-ethionine.

S-adenosyl - 1 - methionine is one of the most important biologically-occurring sulfur compounds which participates in enzymatic trans-methylation reactions as methyl donor. This methyl radical transfer is of fundamental importance in the physiology of all organisms and explains the great pharmaceutical and biochemical interest in this compound. For example, S-adenosyl-1-methionine is the methyl donor in the biosynthesis of the following substances: N-methyl-tetrahydrofolic acid, methionine, choline, adrenaline, metadrenaline, creatine, anserine, L-methylhistamine, N - methyl - nicotinamide, spermidine, spermine, various alkaloids, ribonucleic acid and desoxyribonucleic acid. S-adenosyl-1-ethionine properties are similar to those of S-adenosyl-1-methionine.

The preparation of S-adenosyl - 1 - methionine has previously been carried out by methylating S-adenosyl-1-homocysteine with methyl iodide to give the racemate or by isolation from yeast.

A further method is the enzymatic synthesis from adenosine triphosphate and 1-methionine.

These processes are either very expensive or they lead, as in the case of the isolation from yeast, only to an aqueous solution of a very impure product. For example, the chemical synthesis requires S-adenosyl-1-homocysteine which is very difficult to prepare and, with only moderate yields, gives a product which is only 50% biologically active.

In the case of the enzymatic synthesis, it is first necessary to isolate an enzyme from rabbit liver, which is much too expensive and laborious for a large scale process.

For a large scale process, in the first place, therefore, there is to be considered the isolation from yeast which, however, according to the previously known processes, leads to a product which contains a very disturbing impurity which is extremely difficult to remove. Furthermore, the yields obtained are unsatisfactory.

Due to the chemical properties of S-adenosyl-1-methionine and S-adenosyl-1-ethionine, the isolation and purification of these compounds from yeasts presents substantial difficulties.

S-adenosyl - 1 - methionine and -ethionine are very unstable and break down, depending upon the conditions, into various component parts by fission at points A, B, C, D and E as indicated in the following structural formula:

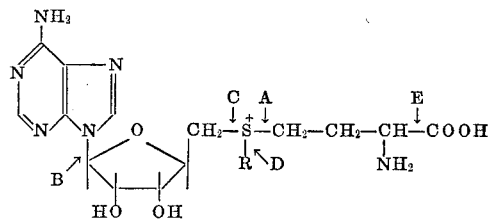

wherein R is methyl or ethyl. Bond A is preferably broken at an elevated temperature and bonds B, C and E are preferably broken in an alkaline medium. At a strongly acidic pH, the glycosidic bond B is also broken. From this, it follows that the substance can only be stable at a weakly acidic pH value which, however, makes the isolation and working up very difficult.

The problem forming the basis of the present invention is to satisfy the purity requirements for S-adenosyl-1-methionine and S-adenosyl - 1 - ethionine, to overcome the disadvantages of the known processes and to provide a process which can be carried out on a large scale. A further object of the present invention is the provision of new derivatives of S-adenosyl - 1 - methionine and S-adenosyl-1-ethionine which have superior properties with regard to stability and ease of isolation.

We have now, surprisingly, found that S-adenosyl-1-methionine and S-adenosyl-1-ethionine can be isolated from yeast with good yields, without great degradation and in pure solid form, without containing undesired impurities.

The process according to the present invention for obtaining S-adenosyl - 1 - methionine or S-adenosyl-1-ethionine from yeast by acidic digestion and cation exchange chromatography is characterized in that, in any desired sequence, a picric acid preparation is carried out and/or boric acid is added and the borate complex formed is rendered weakly alkaline and chromatographed over an anion exchanger.

As starting material for the isolation, there is used, in known manner, yeast, for example, Saccharomyces cerevisiae or Torulopsis, which is enriched in S-adenosyl-1-methionine or S-adenosyl-1-ethionine by the addition of methionine or ethionine. These yeasts can be digested in known manner in an acid medium. This known acidic digestion is carried out with 1.5 N perchloric acid or with trichloroacetic acid at ambient temperature, an average yield of an aqueous solution of a crude product being obtained. On a large scale, this method is unsuitable. The digestion method which also is carried out frequently for obtaining co-enzymes at boiling temperature cannot be carried out in the case of S-adenosyl-1-methionine and S-adenosyl-1-ethionine since, as explained above, bond A would be split.

Surprisingly, we have now also found that this digestion can be carried out by briefly heating the yeast at a pH of 0–3.5, preferably to a pH of 2.0–3.0, to a temperature of 50–70° C., a substantial improvement of the digestion result being achieved. It is especially preferred to use dilute formic acid, for example, with a concentration of 0.05–0.5 M, a pH value of 2.0–3.0 and a temperature of 60° C. The use of formic acid under these conditions does not lead to a significant decomposition of the desired compounds but liberates S-adenosyl-1-methionine and S-adenosyl-1-ethionine from the yeast cells almost quantitatively and does not necessitate separation of the acid used for the digestion before further purification on a cation exchanger. Furthermore, the digestion proceeds very quickly and, nevertheless, completely. Acetic acid is also well suited for this purpose.

After digestion, the aqueous extract obtained is applied to a cation exchanger or, in the case of the use of formic acid, is applied directly to a cation exchanger and, after washing with $H_2O$ is eluted with 0.1 N sulfuric acid. As cation exchanger, "Amberlite" IRC–50 (manufactured by Rohm & Haas Company) has proved to be especially useful.

In the acidic eluate thus obtained, S-adenosyl-1-methionine or S-adenosyl-1-ethionine is either precipitated out as the picrate or, by the addition of boric acid, is converted into a borate complex and this complex chromatographed in a weakly alkaline medium through an anion exchanger. According to both methods, it is possible to remove the disturbing impurities, which could not be removed by the previously known processes, in order to give a very pure product. Preferably, the two process steps according to the present invention are both used, in any sequence, although significant improvements can be obtained by use of either process step alone.

The picrate precipitation is preferably carried out by adding a cold, saturated aqueous picric acid solution and leaving the resultant mixture to stand at a reduced temperature. It is, however, also possible to work at ambient temperature. After precipitation of the S-adenosyl-1-methionine or S-adenosyl-1-ethionine picrate, the precipitate is separated from the supernatant, for example, by filtration or centrifuging, and then dissolved again. As solvent, it is especially preferred to use a mixture of dilute mineral acid and a water-miscible solvent. Because of the ease with which it can be removed as a sparingly soluble salt, the preferred mineral acid is sulfuric acid. As organic solvent, it is particularly preferred to use alcohol or a ketone, especially acetone. The mineral salt of S-adenosyl-1-methionine or S-adenosyl-1-ethionine formed in this way can again be precipitated out by the addition of a further amount of organic solvent, the picric acid thereby remaining behind dissolved in the supernatant. The material thus obtained has a degree of purity of about 40% and, in particular, no longer contains any disturbing components which cannot be separated. Furthermore, picric acid is substantially cheaper than the known precipitation agents as reineckate or phosphotungstate and, therefore, from this point of view, is also more advantageous.

Alternatively, or additionally, S-adenosyl-1-methionine and S-adenosyl-1-ethionine are purified as a borate complex via an anion exchanger. S-adenosyl-1-methionine and S-adenosyl-1-ethionine possess a protonated sulfur atom and thus have a strong cation which is not absorbed by anion exchangers. We have now found that, by the addition of boric acid or of a suitable boric acid derivative, S-adenosyl-1-methionine and S-adenosyl-1-ethionine form a borate complex which can be adsorbed on anion exchangers. Furthermore, we have, surprisingly, also found that this borate complex is relatively stable in a weakly alkaline medium, in contradistinction to free S-adenosyl-1-methionine and S-adenosyl - 1 - ethionine. Whereas, for example, S-adenosyl-1-methionine at pH 8.8 is split to an extent of 70% in 24 hours, the activity of the corresponding borate complex after 72 hours at the same pH value only drops by 30%. This stability enables the alkaline chromatography to be carried out without substantial decomposition since the bonds B, C and E hereby exhibit a substantially increased stability.

The borate complex solution is applied, in weakly alkaline medium, for example at pH 7.0–9, and preferably at pH 8, to the anion exchanger.

As anion exchangers, there can be used the conventional materials, for example "Dowex 1×2 (manufactured by the Dow Chemical Company), preferably in the borate form. For increasing the stability of the S-adenosyl-1-methionine or S-adenosyl-1-ethionine, the chromatography is preferably carried out with cooling, especially at a temperature between 0 and 5° C. The elution of the anion exchanger takes place with a dilute acid, preferably with formic acid.

As already mentioned, it is especially advantageous to carry out both of the process steps according to the present invention. In this case, the picrate precipitation is preferably carried out first, followed by the formation and chromatography of the borate complex. In this way, S-adenosyl-1-methionine and S-adenosyl-1-ethionine are obtained with a high degree of purity. Advantageously, the product is precipitated out of aqueous solution in the form of its bisulfate by the addition of a water-miscible organic solvent. For this purpose, there is preferably used a mixture of methanol with another organic solvent, especially a lower ketone or alcohol, or an ether. There is thus obtained a colorless powder which, in the cold, is stable for months.

For further purification, it is advantageous to carry out a further chromatography over activated charcoal in order to remove entrained salts. The elution of S-adenosyl-1-methionine or S-adenosyl-1-ethionine from the charcoal is preferably carried out at pH 4–5 with a solvent mixture containing pyridine as base. This method of working is more advantageous than the usual elution with ammonia or sodium hydroxide solution at pH 8.

A special advantage of the process according to the present invention is that a disturbing impurity which cannot be separated by the previously known processes can now be removed. This impurity is a substance which gives a weak coloration with ninhydrin. It cannot be precipitated either by the yeast digestion or by perchloric acid. Only a large excess of trichloroacetic acid results in the precipitation of a protein-like product which, however, in contradistinction to normal protein, is afterwards very readily soluble in water.

A further important advantage of the process according to the present invention is the possibility of being able to precipitate S-adenosyl-1-methionine and S-adenosyl-1-ethionine in the form of a sulfate. Hitherto, a precipitation in the normal sense was not possible. The commercially-available S-adenosyl-1-methionine preparations are in the form of the iodide and are obtained from solutions by concentration to dryness and homogenization of the solid residue with absolute alcohol. In this way, practically all of the impurities are entrained, whereas in the case of the precipitation carried out according to the present invention, they are partly separated.

The compounds S-adenosyl-1-methionine·$HSO_4$ and S-adenosyl-1-ethionine·$HSO_4$ are new. Apart from the greater ease with which they can be isolated, they also possess an outstanding stability. Furthermore, they open up the possibility of a further purification by double reaction with a perchlorate since the S-adenosyl-1-methionine and S-adenosyl-1-ethionine perchlorates thereby obtained are, in contradistinction to the accompanying impurities, soluble in acetone and, in this way, can readily be separated.

The following examples are given for the purpose of illustrating the present invention.

EXAMPLE 1

10 kg. bakers yeast enriched with S-adenosyl-1-methionine by Schlenk's method (Enzymologia, 29, 283/1965) were suspended in 40 liters 0.1 M formic acid, heated to 60° C. for 5 minutes and then immediately cooled again. The supernatant, freed from cell fragments by centrifuging, was passed at 0–10° C. through a chromatographic column (length about 140 cm., diameter 5.5–6 cm.) containing the cation exchange resin "Amberlite" IRC–50 in the ammonium form (equilibrated with acetic acid to pH 6), washed with 20 ml. 0.1 M acetic acid and eluted with 0.1 N sulfuric acid. The S-adenosyl-1-methionine-containing fractions were combined (testing for S-adenosyl-1-methionine by paper or thin layer chromatography; system isopropanol:water:glacial acetic acid=50:50:25; $R_f$ of S-adenosyl-1-methione=0.4), mixed with 8 liters of a cold, saturated aqueous solution of picric acid and then left to stand overnight. The picrate precipitate was then filtered off, washed with an ice-cold solution of picric acid and dissolved in a mixture of 800 ml. acetone and 800 ml. 1 N sulfuric acid. This solution was poured, with good stirring, into 8 liters of acetone and the precipitate obtained was centrifuged off, washed twice with acetone and dried in a vacuum (about 60 grams intermediate product containing about 40% S-adenosyl-1-methionine).

The 60 grams of intermediate product obtained were dissolved in 300 ml. distilled water, cooled to 0° C., mixed with 30 grams boric acid and the pH adjusted to 8.0 by the addition of a solution of barium hydroxide. The precipitated barium sulfate was centrifuged off and the clear supernatant was chromatographed through a borate-loaded anion exchanger ("Dowex" 1×2, 50–100 mesh; column dimensions: length about 100 cm., diameter 3 cm.) at a temperature of 0–5° C. The column was washed with a little distilled water at 0° C. and eluted with 0.5 N formic acid. The S-adenosyl-1-methionine-containing fractions were combined, acidified with sulfuric acid to pH 1–2 and applied at 0° C. to a 1.5 liter chromatography column packed with Carboraffin-C carbon. The column was washed with 5 liters ice-cold distilled water and then eluted at 0° C. with a mixture of ethanol:water:pyridine (100:100:5). The S-adenosyl-1-methionine-containing fractions were combined, concentrated in a vacuum to about 300 ml. and acidified with sulfuric acid to pH 1.

This sulfuric acid solution was poured, with good stirring, into a mixture of 3 liters acetone and 1.5 liters methanol. The precipitate of S-adenosyl-1-methionine·$HSO_4$ was centrifuged off, washed twice with acetone and dried in a vacuum.

There were obtained 25 grams S-adenosyl-1-methionine·$HSO_4$, containing 70% S-adenosyl-1-methionine, 23% $SO_4$ and 5–6% water.

EXAMPLE 2

The process of Example 1 was repeated but the dried intermediate product was dissolved in 500 ml. distilled water and, in the manner described in Example 1, chromatographed through a chromatography column containing Carboraffin-C charcoal. Due to the omission of the borate chromatography step, the yield was somewhat higher but at the expense of the purity. There were obtained 32 grams S-adenosyl-1-methionine·$HSO_4$, containing about 50% S-adenosyl-1-methionine.

EXAMPLE 3

The yeast digestion and the chromatography over "Amberlite" IRC-50 were carried out in the manner described in Example 1. The combined S-adenosyl-1-methionine-containing eluates were concentrated in a vacuum to 1.5 liters and poured into 15 liters acetone, with good stirring. The precipitate obtained was centrifuged off, washed twice with acetone and dried in a vacuum. There were obtained about 130–150 grams crude S-adenosyl-1-methionine·$HSO_4$ which, in the manner described in Example 1, was chromatographed as the borate complex via an anion exchanger and a column of charcoal and subsequently precipitated.

There are obtained 30–32 grams S-adenosyl-1-methionine·$HSO_4$, containing about 60% S-adenosyl-1-methionine.

EXAMPLE 4

100 grams crude S-adenosyl-1-methionine·$HSO_4$ with an absolute S-adenosyl-1-methionine content of about 25%, which had been obtained in the manner described above, was dissolved in 500 ml. distilled water and mixed with an aqueous solution of barium perchlorate until the sulfuric acid had been stoichiometrically precipitated out as barium sulfate. The precipitated barium sulfate was centrifuged off, washed once with distilled water, again centrifuged and the combined supernatants were concentrated to about 100–150 ml. The slightly oily concentrate obtained was poured, with good stirring, into 2 liters acetone and then cooled to about −10° C. The precipitate obtained was centrifuged off, washed once with cold acetone at −10° C., again centrifuged and the supernatant combined. By the addition of 25 ml. 10 N sulfuric acid to these supernatants, the S-adenosyl-1-methionine was again precipitated as the sulfate. The precipitate was centrifuged off, washed twice with N/10 sulfuric acid in acetone and once with pure acetone and then dried in a vacuum over anhydrous calcium chloride and phosphorus pentoxide.

There were obtained 30 grams S-adenosyl-1-methionine·$HSO_4$, containing 60% S-adenosyl-1-methionine.

What is claimed is:

1. Process for obtaining S-adenosyl-1-methionine and S-adenosyl-1-ethionine from yeast, which consists essentially of subjecting yeast to acidic digestion wherein said acid digestion is carried out by briefly heating the yeast to 50–70° C. at a pH of 0–3.5 and then subjecting the yeast to cation exchange chromatography, and subjecting the resulting product to at least one of the process steps of (1) picric acid precipitation and (2) boric acid addition to give a borate complex which is then chromatographed through an anion exchanger at a weakly alkaline pH, which process steps (1) and (2), when both are utilized can be carried out in either sequence.

2. Process according to claim 1 wherein dilute formic acid or acetic acid is used for the said acid digestion.

3. Process according to claim 1 wherein the picric acid precipitate obtained upon said picric acid precipitation is dissolved in a mixture of a dilute mineral acid and an organic water-miscible solvent.

4. Process according to claim 3 wherein the organic water-miscible solvent is an alcohol or a ketone.

5. Process according to claim 1 wherein the borate complex-containing solution obtained upon said boric acid addition is adjusted to a pH of 7.0–9 before being chromatographed.

6. Process according to claim 5 wherein the borate complex-containing solution is adjusted to a pH of 8.

7. Process according to claim 1 wherein said borate complex is chromatographed with cooling.

8. Process according to claim 1 wherein the end product is recovered as a solid bisulfate by precipitation from an acidic aqueous solution by the addition of a mixture of methanol with another organic solvent.

9. Process according to claim 1 wherein the end product is desalinated by chromatography over activated charcoal and elution with a pyridine-containing solvent mixture at pH 4–5.

10. Process according to claim 8 wherein the bisulfate is converted into the perchlorate, which is dissolved in acetone, separated from precipitate and, by the addition of sulfuric acid, reconverted into the bisulfate in purified form.

11. S-adenosyl-1-methionine bisulfate.

12. S-adenosyl-1-ethionine bisulfate.

References Cited

UNITED STATES PATENTS

| | | | |
|---|---|---|---|
| 2,415,826 | 2/1947 | Laufer et al. | 260—211.5 R |
| 2,549,827 | 4/1951 | Laufer et al. | 260—211.5 R |
| 2,946,781 | 7/1960 | Shunk et al. | 260—211.5 R |
| 2,969,353 | 1/1961 | Shunk et al. | 260—211.5 R |
| 3,541,078 | 11/1970 | Woo et al. | 260—211.5 R |

LEWIS GOTTS, Primary Examiner

J. R. BROWN, Assistant Examiner

UNITED STATES PATENT OFFICE
CERTIFICATE OF CORRECTION

Patent No. 3,707,536     Dated December 26, 1972

Inventor(s) Erich Haid et al

It is certified that error appears in the above-identified patent and that said Letters Patent are hereby corrected as shown below:

Col. 3, line 74

After "Dowex                      -- " -- insert a quotation mark

Col. 5, line 4

For                                  "methione"

Read                              -- methionine --

Col. 5, line 52

For                                  "50%"

Read                              -- 60% --

Signed and sealed this 10th day of July 1973.

(SEAL)
Attest:

EDWARD M. FLETCHER, JR.          Rene Tegtmeyer
Attesting Officer                      Acting Commissioner of Patents